United States Patent [19]
Reid, Jr.

[11] 3,807,563
[45] Apr. 30, 1974

[54] INDIVIDUAL HOUSEHOLD AERATED WASTE TREATMENT SYSTEM

[75] Inventor: Leroy C. Reid, Jr., College, Alaska

[73] Assignee: The United States of America as represented by the Secretary of the Department of Health Education, and Welfare, Washington, D.C.

[22] Filed: July 27, 1971

[21] Appl. No.: 166,456

[52] U.S. Cl.................. 210/139, 210/197, 210/205
[51] Int. Cl............................................. C02c 1/06
[58] Field of Search .............................. 210/13–15, 210/197, 205, 209, 521, 522, 139

[56] References Cited
UNITED STATES PATENTS

| | | | |
|---|---|---|---|
| 3,472,764 | 10/1969 | Culp et al. ........................ | 210/13 X |
| 3,673,082 | 6/1972 | Reid..................................... | 210/12 |
| 3,043,433 | 7/1962 | Singer............................... | 210/14 X |
| 3,056,749 | 10/1962 | Griffith ............................. | 210/13 X |
| 3,640,387 | 2/1972 | Conley et al..................... | 210/521 X |
| 2,987,186 | 6/1961 | Burgoon et al. .................. | 210/13 X |
| 3,385,444 | 5/1968 | Dufournet............................ | 210/15 |

*Primary Examiner*—Samih N. Zaharna
*Assistant Examiner*—Thomas G. Wyse

[57] ABSTRACT

A system for the treatment of sewage from houses or small apartments employing an air lift for circulation, agitation, oxygenation, reduction, and comminution. The biological mass and other solids are separated from the water by the use of inclined plane settlers which permit the activated sludge to settle out.

3 Claims, 4 Drawing Figures

INVENTOR
LEROY C. RIED, JR

BY Browdy and Neimark
ATTORNEYS

INDIVIDUAL HOUSEHOLD AERATED WASTE TREATMENT SYSTEM

The present invention relates to sewage treatment systems and more particularly to sewage treatment systems employing aeration and inclined plate settlers for the removal of solids.

Domestic sewage disposal presents a serious problem in areas not serviced by adequate sewer facilities. In rural areas where the water table is low and water shortages occur over long periods, the problem of the volume of water consumption also arises. The high cost of providing adequate water supplies in large communities is another outstanding problem.

A number of attempts have been made to meet these problems by the provision of domestic sewage treatment units, septic tanks, cess pools, systems of above ground and below ground filters, and re-circulation of effluent for re-use in certain household units. Although in some instances widely used, these previous methods have been generally characterized by inefficient operation, incomplete sewage treatment and unpleasant and tedious periodic maintenance. Prior systems which have returned effluent for use in household units have required special installation for the units.

The present invention offers many improvements and advancements over these prior art systems. It employs a novel air lift for circulation, agitation, oxygenation, reduction and comminution of sewage from houses and small apartments. The biological mass and other solids in the effluent waters are separated from the water by use of inclined plate settlers, and the system has an automatic cycle to turn off the air supply, allow the activated sludge to settle, and rinse the plate settlers to remove the sludge that is not removed by gravity.

The treated wastewater is very low in suspended solids and biological oxygen demand with a mean suspended solids removal of 97 percent and a mean biological oxygen demand removal of 96 percent. No objectionable odors are associated with the device which may be constructed of metal, plastic, or fiberglass compounds with no detrimental effects to the operation. There are no moving parts inside the reaction chamber, the only moving parts being in the time clock, air pump and solenoid air control valve located outside the chamber.

It is, accordingly, an object of the present invention to overcome the deficiencies of the prior art.

It is another object of the present invention to provide an improved sewage treatment system.

An object of the present invention is the provision of a sewage treatment system employing inclined plate settlers for the removal of activated sludge.

Another object is the provision of a system utilizing a novel air lift for the oxygenation, agitation, circulation and comminution.

Still another object of the present invention is the provision of a sewage treatment system having no moving parts inside the reaction chamber.

Other objects and many of the attendant advantages of the invention will be readily appreciated as the same becomes better understood by reference to the following detailed description when considered in connection with the accompanying drawings in which like reference numerals designate like parts throughout the figures thereof and where FIG. 1 shows an elevational view of the reaction chamber.

Figure 1:
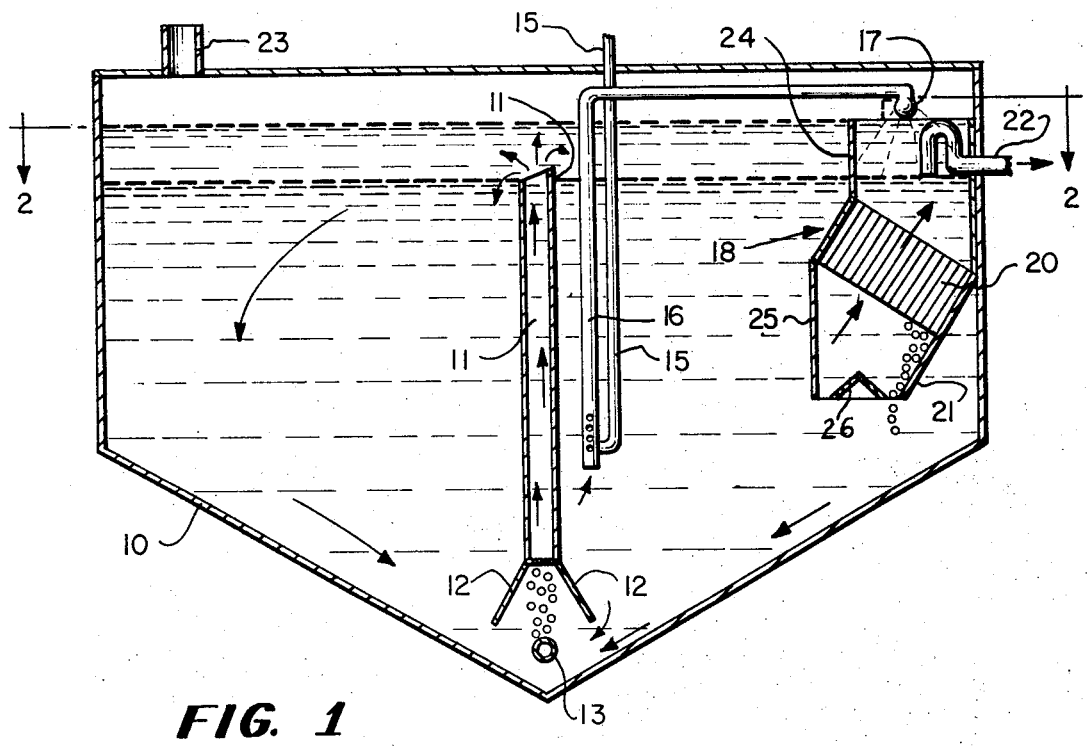
Figure 2:
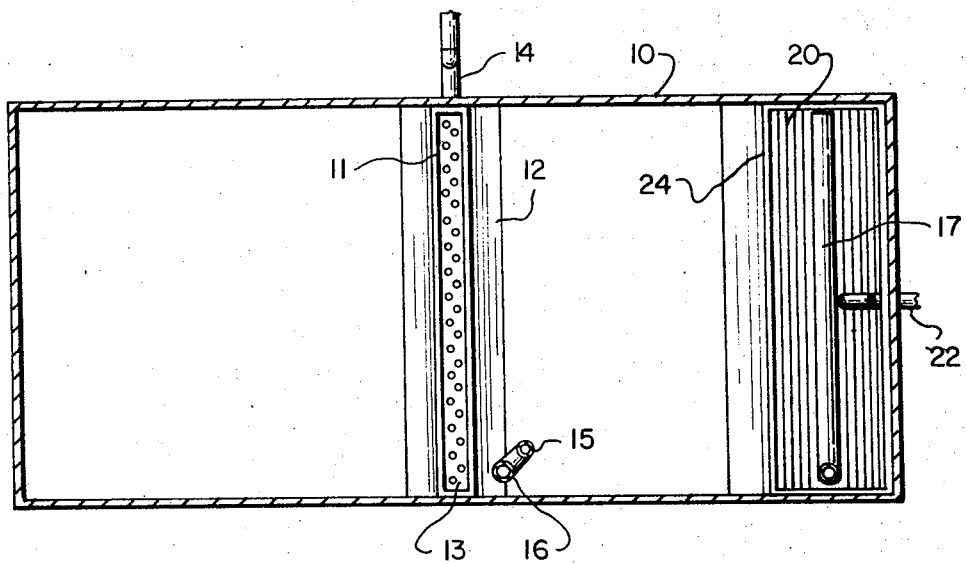
FIG. 2 is a sectional view taken along the line 2—2 of FIG. 1.

Referring now to FIG. 1 for an overall elevational view of the entire system, there is shown a tank 10 for the receiving and processing of sewage. Tank 10 is shown to be generally rectangular in configuration when viewed from above and while its size may vary depending upon the quantity of sewage to be treated, a suitable size for household use may be in the order of 6 feet by 4 feet, with a downwardly sloping base, toward the center, the purpose of which will become more obvious hereinafter. While tank 10 may be made of plastic or fiberglass the embodiment shown is constructed of sheet aluminum attached to a metal framework.

Located at the center of tank 10 and positioned over the lowest point of the sloping bottom, there is an air lift 11 having the general configuration of a relatively flat, elongated, rectangular channel which is open at its top and bottom ends, and which extends transversely across the width of tank 10.

Figure 3:
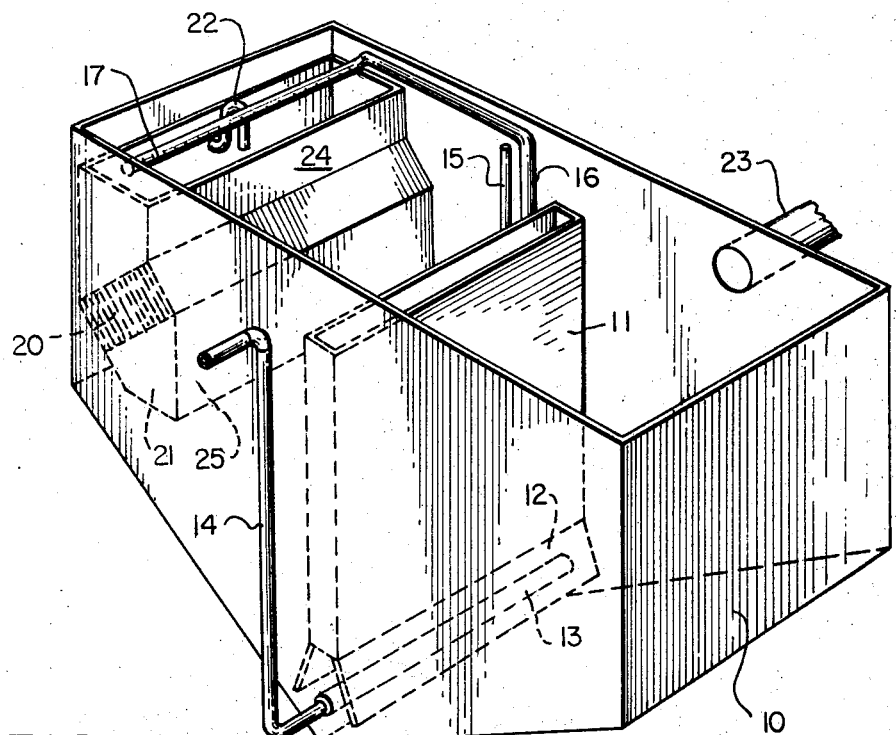
FIG. 3 shows a perspective view of the reaction chamber.

The top end of the air lift 11 is preferably higher, as shown at numeral 11' in FIG. 1, or toward the side of the tank 10 containing the clarified water removal structure, described in detail below, although a uniform upper surface may also be used as shown in FIG. 3. The preferred configuration, of about 1½ inches added height at 11', reduces the flow and velocity in the discharge side of the tank 10.

The top end of an air lift 11 extends to within a relatively short distance of the top of the tank, while the bottom of the air lift has short, spread apart flanges 12 for guiding air bubbles up the length of the lift. Just below the bottom end of air lift 11, and located substantially between flanges 12 there is an air diffuser 13 for supplying air bubbles to lift 11. Diffuser 13 is not only placed below flanges 12 but it is also in the apex of the sloping bottom of tank 10, extending transversely across the width of the tank for the entire distance of the lift. Diffuser 13 comprises a cylindrical pipe with air emitting holes along its top side so that bubbles rise between flanges 12 and up the air lift 11, air being supplied to the diffuser by means of a supply pipe 14, connected to an air compressor, not shown. It is clear from this structure that sludge, sliding down the sloping bottom of tank 10 automatically collects at the lowest point of the tank, and in the vicinity of diffuser 13, where it is lifted by the air stream upwardly the length of air lift 11, being oxygenated and decomposed along the way.

A second air supply pipe 15 extends vertically down into the tank and substantially parallel with air lift 11, the bottom end of pipe 15 joining the bottom of a backwash air lift 16, also extending vertically into the tank. Air bubbles from supply pipe 15 rise up backwash air lift 16 sucking, in the process water through the open end of air lift 16, the water being carried along the confines of the air lift and ultimately being ejected through a spray nozzle 17 in the form of clarified water, as will be described more fully hereinafter.

Across one end of tank 10 there is located a plate settler 18, mounted at a slanting, oblique, angle with the centerline of the tank. The inclined settler consists of a plurality, for example, 27 narrow rectangular plates 20, preferably about 1½ ft. long and placed parallel to each other about 3/8 to 1/2 inches apart. The settler or special filter 18 is separated from the remainder of the tank 10 by baffles 24 and 25 or equivalent structure defining a filter plate chamber. Due to the spacing and length of the plates 20, the oxygen treated sewage moves upwardly along the plates 20 with about 97 percent of the solids in the treated sewage being trapped between the plates with the liquid and the 3 percent remaining solids passing through the spaces between plates, the bulk of the solids then moving downwardly through the plates and along a guide plate 21 to fall into the tank, as shown in FIG. 1. These solids will ultimately wind up at the low point of the tank, in the vicinity of diffuser 13.

It is also preferred, as shown in FIG. 1, to provide a baffle 26 at the bottom of the plate chamber. This baffle 26 suitably forms an inverted V in cross-section with the ends of the V-legs spaced about 1 inch, respectively, from the guide plate 21 and the baffle 25. The baffle 26 serves to help keep stray currents out of the plate chamber.

Positioned in an end wall of tank 10, near the inclined settler 18, there is an exit pipe 22, having the general configuration of an inverted S, this exit pipe determining the operation range of fluid in the treatment system, since the top curve of the S sets the upper limit of the water, and the lower part of the pipe sets the lower limit of the water. Naturally the operating range is between these limits as determined by the size of the S pipe.

An entrance pipe 23 is inserted in the top of the tank, and connected to the appropriate drainage system of the house, for the admittance of raw sewage to the treatment system.

Figure 4:
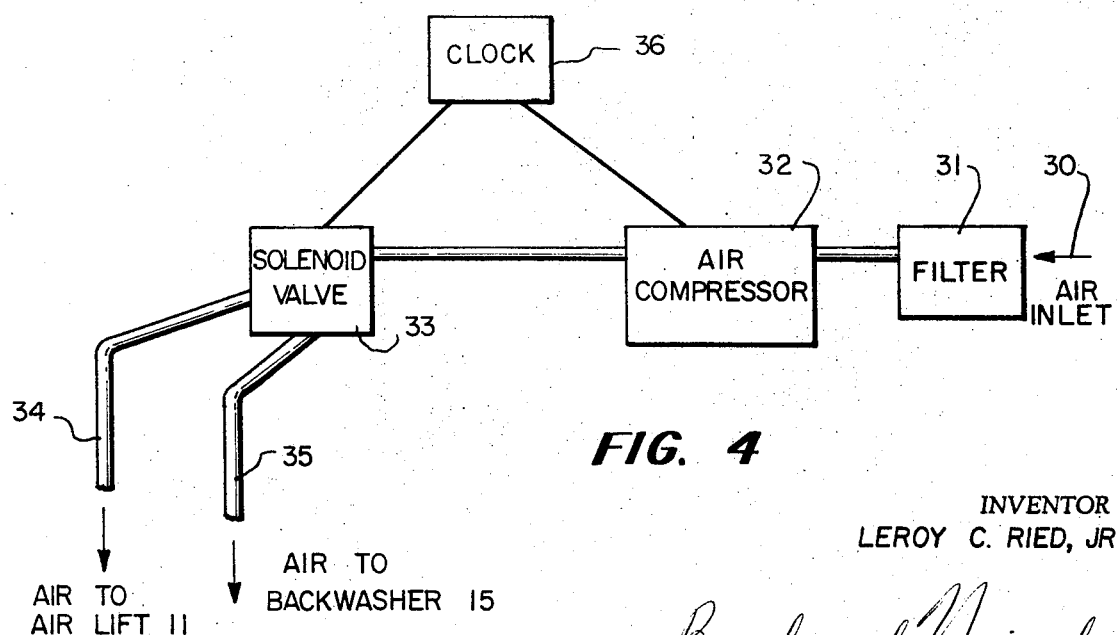
FIG. 4 shows a schematic of the air and electrical supply for the system.

Referring briefly to FIG. 4, there is shown a schematic of the air supply system of the invention. Air enters an inlet 30 where it is filtered at 31 before passing to an air compressor 32, the output of the compressor feeding a solenoid valve 33. Solenoid valve 33 alternately controls the flow of air through either of the two output pipes 34 or 35, pipe 34 supplying air to air lift 11 and pipe 35 supplies air to backwasher 15. A clock 36 which is connected to air compressor 32 and solenoid valve 33 controls the timed cycling of the system as will be described hereinafter.

Turning to the operation of the system, raw sewage is furnished from the drainage system of a house or small apartment, is admitted to treatment tank 10 through opening 23 in the top of the tank. At regularly recurring intervals, as determined by clock 36, air compressor 32 is started and solenoid valve 33 is activated to supply air through pipe 34. Pipe 34 is, in turn, connected to pipe 14 so that the air supplied to air diffuser 13 causing a vast number of bubbles to rise through the liquid, between spread apart flanges 12, and up the rectangular shaped air lift 11, thereby providing an aeration treatment of the sewage and a rotational circulation throughout the tank.

As this operation continues, the heavier particles of treated sewage, known as activated sludge falls to the bottom of the tank 10 where they may be lifted and further aerated by air lift 11. Meanwhile, as fresh sewage is added via inlet 23 the level in the tank rises until clarified water may escape from outlet 22. Because of the baffle 24, this escaping liquid can come only from liquid which has been filtered through the plate separator 18. The small particles of activated sludge which settle on the plates 20 of the inclined settler 18 slide downwardly along such plates 20 by gravity, the particles ultimately falling off the guide plate 21 to follow the sloping bottom of tank 10 to diffuser 13 where they may be aerated by air lift 11.

Aeration continues for a predetermined period, say from 2 AM to 12 PM for example, when clock 36 stops the air compressor 32. The system then sits quiescent and settles until 1:45 AM. Air compressor 32 now starts after solenoid valve 33 switches air control to pipe 35 and thence to pipe 15 to operate backwash airlift 16 that sprays clarified water from sprayer 17 over settler plates 20 to break up any floating sludge and backwash the plate settlers of any sludge that has not been removed by gravity. At 2 AM solenoid switch 33, in response to signals, from clock 36, switches air back to airlift 11, starting the circulation and aeration of the activated sludge.

Sewage continues to enter the tank until it reaches the upper limit level shown in FIG. 1, at which time a syphoning action starts and treated water is expelled through pipe 22 until the lower water level is reached.

Thus it can be seen that the sludge is kept in suspension when the air is applied, and it then settles during the "off air" period. The system is auto-oxidation, meaning that all organics are oxidized to inerts before discharge. Most package plants slough solids into the effluent. The plate settlers keep this from happening except on a very small scale (i.e., bacteria cases and any debris under the size that can be removed by the plate settlers). Therefore, the tank is designed to hold the sludge for up to 6 months before it is pumped out by the integral sludge airlift.

The use of the plate settler 18 as the filter is an important part of the present invention. While any small particle filter, such as a supported sand bed or cloth filter, would serve the filtering function, these small particle filters become easily clogged, and the device would then not be subject to the simple backwashing and low maintenance of the present invention.

It will be obvious to those skilled in the art that various changes may be made without departing from the scope of the invention and the invention is not to be considered limited to what is described in the specification. For example, the rectangular air lift 11 could be replaced by a line of tubular air lifts, or even by a single tubular air lift preferably in conjunction with the use of suitable baffles. Also, the vertical part of the air inlet tube 14 shown in FIG. 3 could be placed within the tank 10.

What is claimed is:

1. A compact, single tank aerated water treatment system for treating relatively small quantities of raw sewage with low cost and maintenance comprising:
   a tank for storing and treating sewage, said tank having a bottom wall sloping toward a central trough;

a source of compressed air;
   diffuser means connected to said source of compressed air for receiving the air and diffusing it through the sewage and aeration means for oxidizing and circulating the sewage, said diffuser means being located adjacent the lowest portion of of said sloping bottom wall and extending substantially the length of, parallel to, and a short distance above said central trough, and said aeration means comprising a pair of parallel walls defining a vertically extending channel with spread apart flanges at the bottom and open at the top, said flanges encompassing an area immediately above the diffuser means, so that air emitted by the diffuser means travels upward through the channel;

means to feed raw sewage to said tank;

baffle means in said tank to define a vertical exit chamber open at the bottom with an inverted V-shaped baffle extending partly across the open bottom;

means to remove clarified liquid from said exit chamber;

filter and settling means within said exit chamber for separating out the particles of sludge from the clarified liquid, said filter and settling means comprising a plurality of plates about 1½ feet long, said plates being inclined with respect to the horizontal axis of the tank and being spaced 3/8 – 1/2 inches apart;

timing means for controlling the operation of the source of compressed air;

a backwash airlift extending vertically through the tank and opening within the tank;

means connecting said backwash airlift to the source of compressed air; and a sprayer connected to the discharge end of the backwasher, said sprayer being positioned above the filter and settling means.

2. The device of claim 1 further including valve means connected to the source of compressed air, the diffuser, and the backwasher, said valve means operating in response to signals from the timing means.

3. The device of claim 1 wherein said vertical channel extends upwardly further on its side closest to said exit chamber.

* * * * *